(12) United States Patent
Tiberghien et al.

(10) Patent No.: US 10,458,584 B2
(45) Date of Patent: Oct. 29, 2019

(54) QUICK COUPLING

(71) Applicant: STAUBLI FAVERGES, Faverges (FR)

(72) Inventors: Alain-Christophe Tiberghien, Sevrier (FR); Christophe Durieux, Gilly sur Isere (FR); Francois Michel, Mercury (FR)

(73) Assignee: STAUBLI FAVERGES, Faverges (FR)

( * ) Notice: Subject to any disclaimer, the term of this patent is extended or adjusted under 35 U.S.C. 154(b) by 133 days.

(21) Appl. No.: 15/715,851

(22) Filed: Sep. 26, 2017

(65) Prior Publication Data

US 2018/0100613 A1    Apr. 12, 2018

(30) Foreign Application Priority Data

Oct. 6, 2016  (FR) ...................................... 16 59651

(51) Int. Cl.
  *F16L 37/23*    (2006.01)
  *F16L 37/084*   (2006.01)
  (Continued)

(52) U.S. Cl.
  CPC ........... *F16L 37/23* (2013.01); *F16L 37/0844* (2013.01); *F16L 37/38* (2013.01); *F16L 37/44* (2013.01); *F16L 37/42* (2013.01)

(58) Field of Classification Search
  CPC ....... F16L 37/42; F16L 37/0844; F16L 37/38; F16L 37/44; F16L 37/23; F16L 37/413; F16L 37/32; F16L 37/36; F16L 37/34
  See application file for complete search history.

(56) References Cited

U.S. PATENT DOCUMENTS

| 6,050,298 A  | * | 4/2000 | Lacroix ................... F16L 37/23 |
| | | | 137/614.03 |
| 7,472,930 B2 | * | 1/2009 | Tiberghien .......... F16L 37/0841 |
| | | | 285/316 |
| 9,752,713 B2 | * | 9/2017 | Tiberghien .............. F16L 37/42 |

FOREIGN PATENT DOCUMENTS

| EP | 0100090 A1 | 2/1984 |
| EP | 0184799 A2 | 6/1986 |
| WO | 01/73335 A1 | 10/2001 |

OTHER PUBLICATIONS

International Search Report From FR1659651 From Which This Application Claims Priority.

* cited by examiner

*Primary Examiner* — Mary E McManmon
*Assistant Examiner* — Andrew J Rost

(57) ABSTRACT

This coupling (R) includes a male element (A) including a male body (2) provided with a locking relief (22), a purging ring (4) movable between a rear position, in which the purging ring closes off a purging passage of the male body, and a forward position, and a female element (B) including a female body (12, 14), a ball-retainer (23) carrying locking balls (18) of the male body, in a housing between a first position, in which they are able to oppose the removal of the locking relief, and a second position, in which the locking balls allow the removal of the locking relief, a valve body (25) secured to the ball-retainer, including coupling balls (27) suitable for securing the valve body and the female body in translation, an inner ring (29) suitable, in a retaining position, for keeping the valve body and the female body coupled by the coupling balls when the female element is uncoupled from the male element. In a first coupling configuration, the locking balls have crossed the locking relief of the male element; in a second coupling configuration, the (Continued)

inner ring has reached a position in which it no longer keeps the valve body and the female body coupled by the coupling balls; in a third coupling configuration, the female body keeps the locking balls in their first position; and in a fourth coupling configuration, the valve body has reached a position that allows fluid to pass between the two conduits. The female element includes steering means (32) able to drive the purging ring toward its forward position during the uncoupling.

15 Claims, 17 Drawing Sheets

(51) Int. Cl.
     *F16L 37/38*      (2006.01)
     *F16L 37/44*      (2006.01)
     *F16L 37/42*      (2006.01)

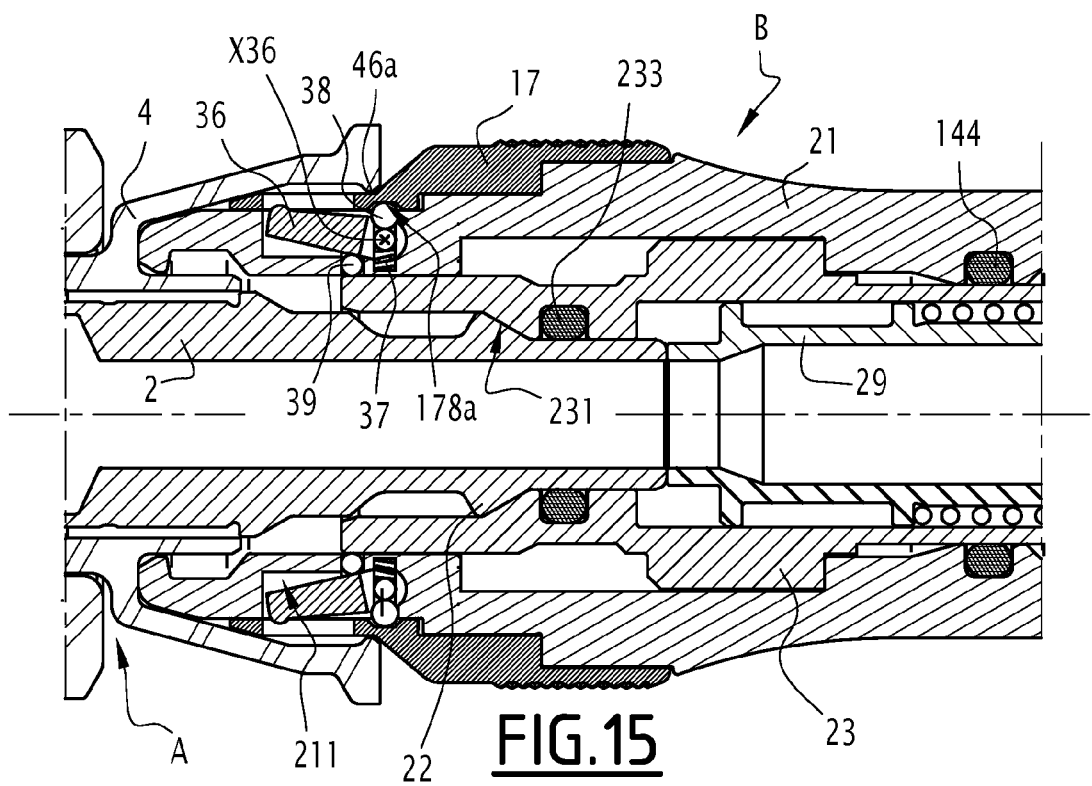
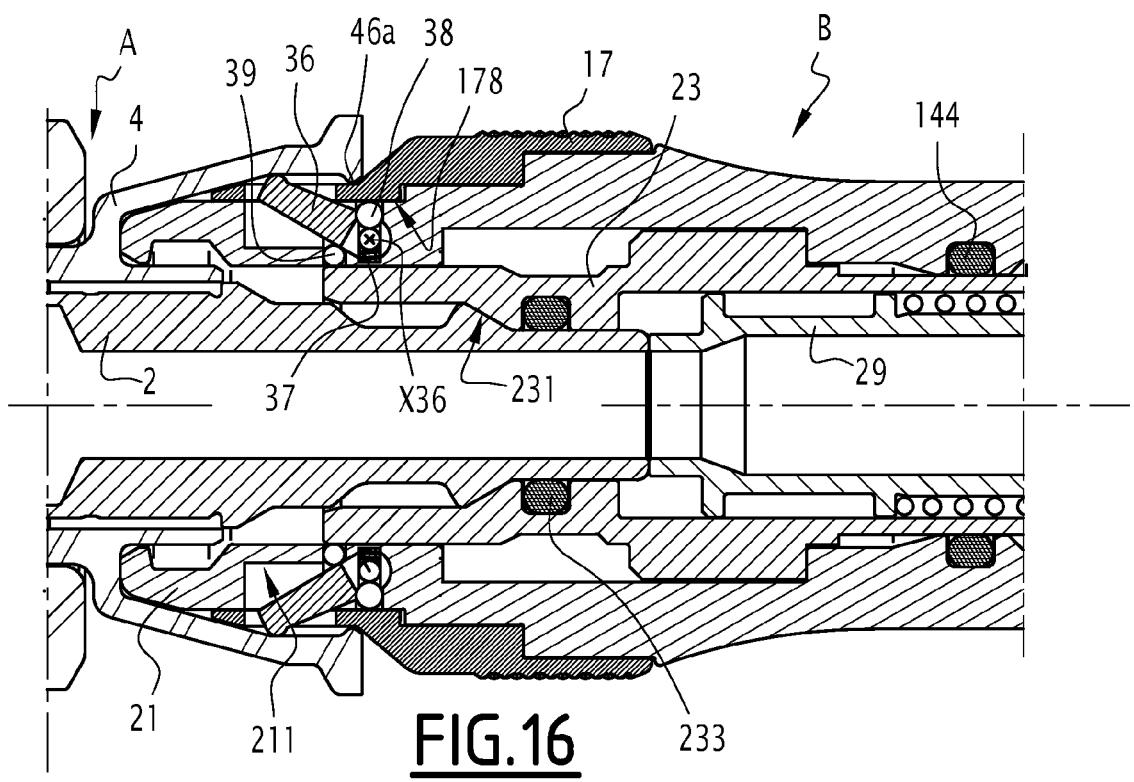

QUICK COUPLING

The invention relates to a quick coupling for connecting fluid conduits.

In the field of motorsports, vehicles are lifted when changing tires using a pneumatic system of lifting jacks. It is known from U.S. Pat. No. 5,765,810 to supply air to four pneumatic jacks making it possible to raise a car from an onboard compressor, in order to perform repairs. In the context of motorsports, the compressor is installed on a pit, and after a tire change, it is important to depressurize the downstream conduit connected to the circuit of the pneumatic jacks and to uncouple the coupling elements in one very fast maneuver. This function is currently performed in two operations and requires several maneuvers that restrict the operator's work sequence.

It is known to use a mechanical assembly to connect air conduits between a compressor and the pneumatic lifting jack circuit of the vehicle. This assembly performs a coupling sequence to securely supply air to the downstream circuit to be pressurized.

The existing circuits provide a male element equipped with a ring translatable around a plug connected to the downstream circuit, which may or may not close off the downstream circuit, and a female element that is in communication with the upstream circuit, and equipped with a locking system able to lock on the plug of the male element. Upon coupling, the female element axially pushes the ring back to close off the downstream circuit, lock on the male plug, and supply air before uncoupling.

This operation does not make it possible to associate automatic purging of the downstream circuit with the coupling operations of the coupling, the purging operation therefore being done after uncoupling the two coupling elements, by manually advancing the ring into its purging position.

The invention more particularly aims to resolve these drawbacks by proposing a new coupling, in which the purging maneuver is allowed more quickly and practically than in the known systems.

To that end, the invention relates to a quick coupling for sealably joining fluid conduits, including a male element suitable for being connected to a first conduit and a female element suitable for being connected to a second conduit, the male element including:

a male body provided with a locking relief and defining an inner channel in communication with the first conduit,
a purging ring of the first conduit, surrounding the male body, and movable between a rear position, in which the purging ring closes off a purging passage of the male body, and a forward position, in which the purging ring no longer closes off the purging passage, the female element including:

a female body defining an inner channel in communication with the second conduit,
a ball-retainer arranged inside the female body, forming a receiving housing of the male body and bearing locking balls of the male body, said locking balls being movable in a housing between a first position, in which they are able to oppose the removal of the locking relief, and a second position, in which the locking balls allow the removal of the locking relief,
a valve body secured to the ball-retainer, translatable in the female body between a forward position, in which it closes off the fluid passage toward the second conduit, and a rear position, in which the passage toward the second conduit is open, the valve body including coupling balls suitable for securing the valve body and the female body in translation,
an inner ring arranged inside the valve body, suitable, in a retaining position, for keeping the valve body and the female body coupled by the coupling balls when the female element is uncoupled from the male element.

The coupling is characterized in that:

in a first coupling configuration by bringing the male element and the female element closer together, the locking balls have crossed the locking relief of the male element,
in a second coupling configuration by coming closer together, the inner ring has reached a position in which it no longer keeps the valve body and the female body coupled by the coupling balls,
in a third coupling configuration by coming closer together, the female body keeps the locking balls in their first position,
in a fourth coupling configuration by coming closer together, the valve body has reached a position that allows fluid to pass between the two conduits,
the female element includes steering means able to drive the purging ring from its rear position toward its forward position during the uncoupling of the male and female elements by moving away from one another.

Owing to the invention, the coupling of the male element in the female element has a sequence with several configurations, which make it possible, upon uncoupling, to actuate the purging ring via the female element before unlocking the male element.

Owing to the invention, the choice to deactivate the steering means is made as a preparation for lifting operations, during hidden time, such that the operator can perform simple gestures and focus his efforts on the coupling and uncoupling operations during lifting of the vehicle.

According to advantageous, but optional aspects of the invention, such a coupling may incorporate one or more of the following features, considered in any technically allowable combination:

The steering means can be selectively deactivated such that they do not drive the purging ring during uncoupling.
The female element comprises a selector ring allowing the deactivation of the steering means, mounted around the female body and rotatable between a first position, in which it keeps the steering means in a position in which they cannot drive the purging ring during uncoupling of the male and female elements, and a second position, in which the steering means are able to drive the purging ring from its rear position toward its forward position during the uncoupling.
The steering means are steering balls housed in the female body and movable between a first position, in which the steering balls protrude from the female body and interfere with the purging ring, and a second position, in which the steering balls do not protrude from the female body.
The female element includes control fingers of the steering balls, movable between a first position, in which the steering balls are moved radially away from their first position, and a second position, in which the steering balls are radially aligned with a notch of the control fingers and are free to reach their second position.
The control fingers of the steering balls are kept in their second position by the ball-retainer against a force of a spring in the first and second coupling configurations, and are kept in their first position by the female body in the third and fourth coupling configurations.

The steering means are claws movable between a deployed position, in which they protrude from the female body and interfere with the purging ring, and a retracted position, in which the claws do not interfere with the purging ring.

The female element includes control balls of the claws, movable between a low position, in which the claws are free to reach their retracted position centripetally, and a high position, in which the control balls keep the claws in their deployed position.

The control balls bear on a ramp of the ball-retainer between a lower diameter corresponding to the retracted position of the claws and an upper diameter corresponding to the deployed position of the claws.

In the fourth coupling configuration by coming closer together, the purging ring is in the rear position, in which the purging ring closes off a purging passage of the male body.

In the second coupling configuration by coming closer together, the inner ring has reached a position in which it couples itself to the valve body via the coupling balls.

The inner ring is returned toward its retained position in which it keeps the valve body and the female body coupled by the action of a return spring during the uncoupling.

In the third coupling configuration by coming closer together, the steering means have passed an inner collar of the purging ring.

The locking balls and the coupling balls are identical and supported by the ball-retainer.

The female element includes a control and steering ball bearing on a ramp of the ball-retainer between an upper diameter for which the ball protrudes from the female body and interferes with the inner collar of the purging ring, and an upper diameter for which the steering and control ball does not protrude from the female body.

The invention will be better understood, and other advantages thereof will appear more clearly, in light of the following description, provided as a non-limiting example in reference to the appended drawings, in which:

FIG. 15 is a longitudinal sectional view of part of the coupling of FIGS. 12 to 14, in an alternative operating mode, the male element abutting against the female element;

FIG. 16 is a sectional view similar to FIG. 15, the coupling being in its operating mode of FIGS. 12 to 14;

Figure 1:
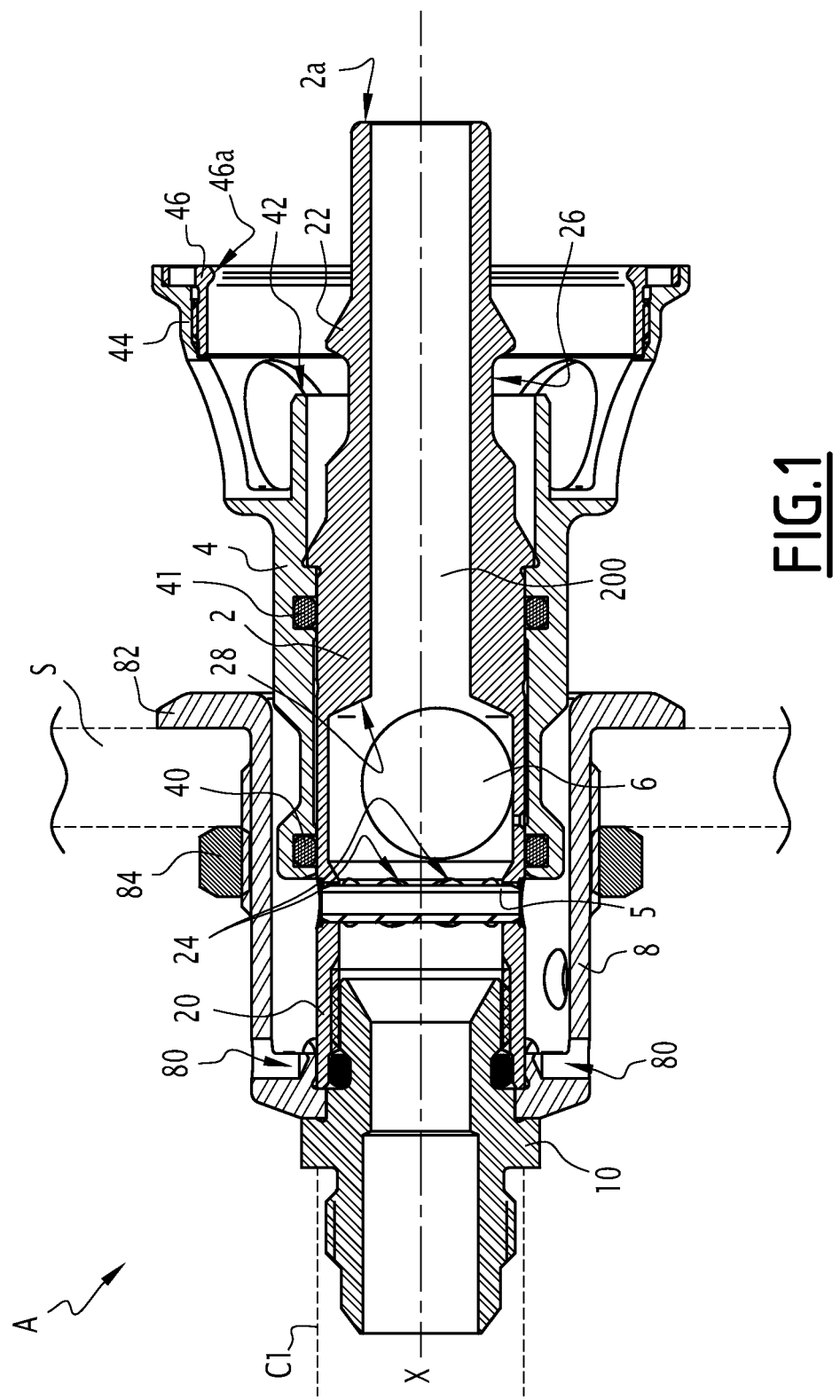
FIG. 1 is a longitudinal sectional view of a male element belonging to a coupling according to the invention.

FIG. 1 shows a male element A. The male element A comprises a male body 2 centered around a longitudinal axis X. The male body 2 defines an inner channel 200 allowing fluid to pass along the axis X. The male element A is suitable for being connected to a first conduit C1.

In the present description, the adjectives "axial" and "radial" and the adverbs "axially" and "radially" are used in reference to the central axis X. A radial surface is a cylindrical surface surrounding the axis X, while an axial surface is a surface perpendicular to the axis X.

Coupling refers to the function of securing two translatable parts in translation, with coupling means allowing this securing by cooperation with the two coupled parts and generally with a third movable part acting on the coupling means to maintain this securing.

Figure 2:
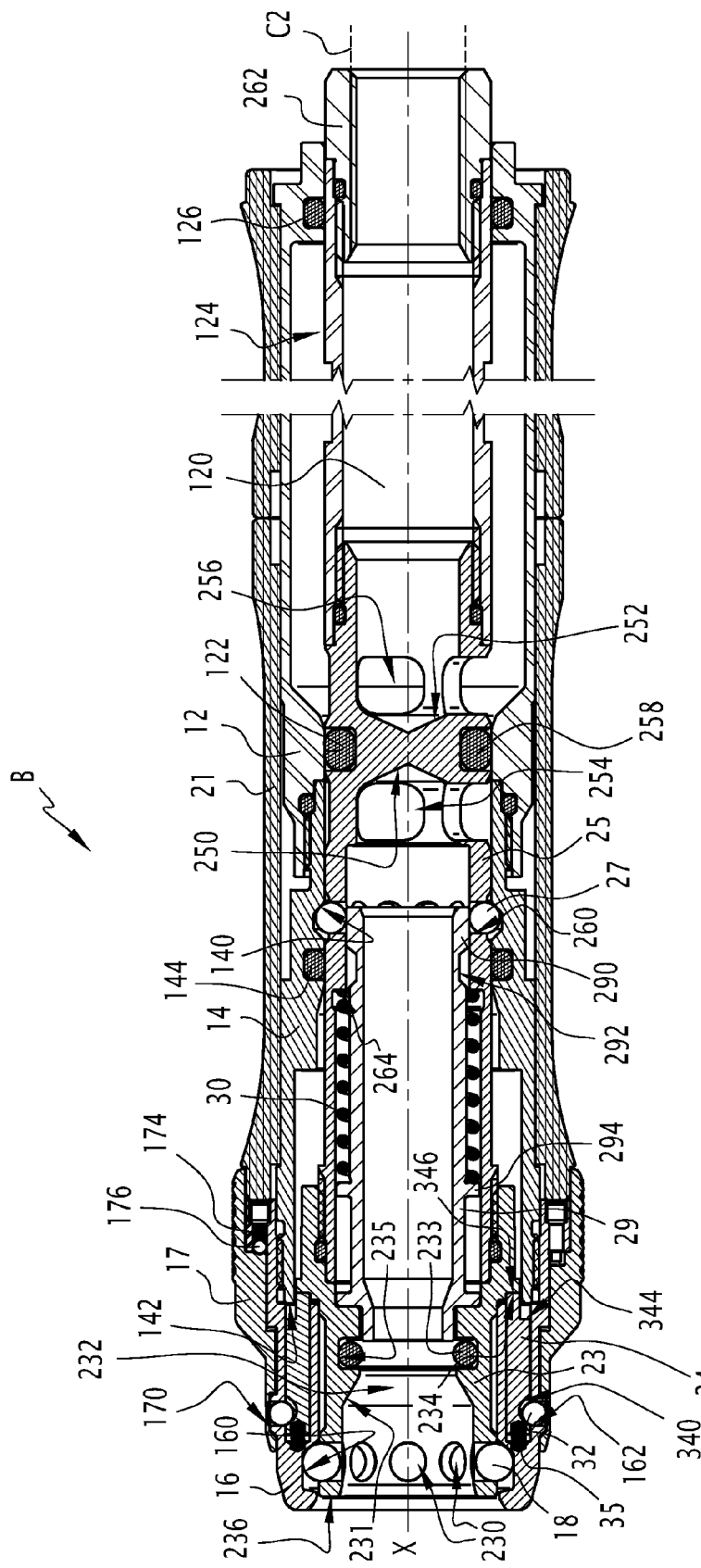
FIG. 2 is a longitudinal sectional view of a female element belonging to a coupling according to the invention.
Figure 3:
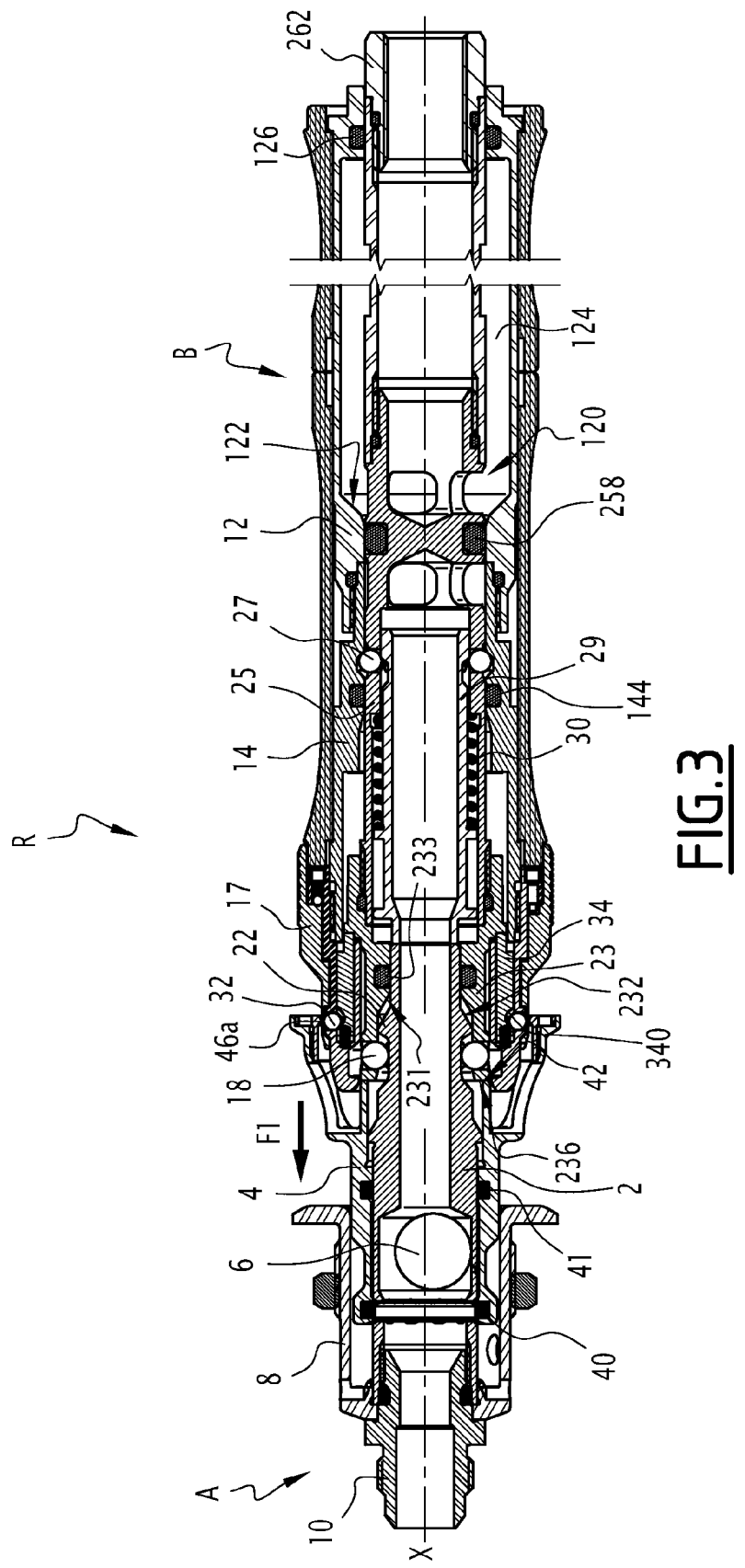
FIGS. 3, 4 and 5 are longitudinal sectional views of the coupling formed by the male element of FIG. 1 and the female element of FIG. 2, in three successive coupling configurations.

The male body 2 is intended to be coupled with a female element B, shown in FIG. 2, to form a coupling R, shown in FIG. 3.

Hereinafter, for the male element A and the female element B, the front side is that which is respectively oriented on the side of the female element B or the side of the male element A, while the rear side is that which is respectively situated opposite the female element B or the male element A.

A front end of the male body 2 is provided with a locking relief formed by a collar 22 suitable for being retained in the female element B when the coupling R is coupled.

The male element A also comprises a purging ring 4 surrounding the male body 2 and translatable along the axis X relative to the male body 2. The purging ring 4 is suitable for closing off or allowing passage through a purging passage of the male body 2, formed by several radial orifices 24 placing the inner channel 200 in communication with the outside. The purging ring 4 is movable between a rear position, shown in FIG. 6, in which it closes off the purging orifices 24, and a forward position, shown in FIG. 1, in which the purging ring 4 no longer closes off the purging orifices 24. The purging ring 4 has two sealing zones formed by two annular seals 40 and 41 forming a sealed chamber with the male body 2 between them. In the rear position of the purging ring 4, the purging orifices 24 are situated axially between the seals 40 and 41.

The purging ring 4 comprises a front stop surface 42 suitable for abutting against a surface of the female element B.

The purging ring 4 has an extension 44 oriented in the forward direction and the diameter of which becomes wider toward the front of the male element A. An annular insert 46 is screwed on an inner part of the extension 44. The annular insert 46 has an inner collar 46a, forming a diameter restriction extending toward the axis X.

According to an alternative embodiment shown in FIGS. 12 to 16, the insert 46 can form a single piece with the purging ring 4.

Behind the collar 22, the male body 2 has a groove 26, the diameter of which is smaller than that of the collar 22.

A ball 6 is provided in the channel 200 and is suitable for pressing on a concave seat 28 of the male body 2 to form an isolating plug when the pressure from the circuit C1 is installed.

The male element A also comprises a junction ring 8, which surrounds part of the male body 2 and part of the purging ring 4. The junction ring 8 is radially pierced by orifices 80 facilitating the release of air purged by the purging orifices 24. The junction ring 8 has a radial flange 82 able to press against a support S that may be a vehicle chassis or a part attached on the body of a vehicle, and a nut 84 making it possible to screw the junction ring 8 on the support S.

The male element A also comprises an adapter 10 fastened to the rear of the male body 2 by screwing, which secures the junction ring 8 to the male body 2 and is in fluid communication with a downstream pneumatic vehicle lifting circuit. The first conduit C1 is fastened on the adapter 10 and communicates with the channel 200.

The female element B shown in FIG. 2 comprises a female body including a rear female body 12, an intermediate female body 14 and a front female body 16. The rear female body 12 is fastened on the intermediate female body 14, which in turn is fastened on the front female body 16. The female body defines an inner channel 120.

The front female body 16 has an inner slot 160 that accommodates locking balls 18. The female element also comprises a ball-retainer 23 housed inside the front female body 16 and translatable along the axis X relative to the latter. The ball-retainer 23 has radial housings 230 in which the locking balls 18 are housed. The ball-retainer 23 defines, on its front part, a reception area 232 of the front end of the male body 2, and a seat 231 over a reduced diameter that receives, in a groove 235 at its inner radial surface, a seal 233 for sealing on the male body 2 that allows the passage 200 to be placed in sealed communication with the inner channel 120.

The ball-retainer 23 is secured in translation along the axis X with a valve body 25 translatable relative to the rear 12, intermediate 14 and front 16 female body. The valve body 25 is formed by two opposite front 250 and rear 252 longitudinal piercings. The front 250 and rear 252 piercings respectively emerge on radial openings 254 and 256, axially separated by a sealing gasket 258 bearing on a seat 122 formed on the rear female body 12. A chamber 124 is provided in the body 12 between two seals 126 and 144 to cause the fluid to communicate through the radial openings 254 and 256 when the valve body 25 no longer bears on the seat 122.

The valve body 25 has, on the front side relative to the seal 258, radial housings 260 accommodating coupling balls 27. The coupling balls 27 make it possible to secure the valve body 25 axially in translation with the intermediate female body 14. To that end, the intermediate female body 14 comprises a groove 140 in which the coupling balls 27 are received in FIG. 2.

The female element B also comprises an inner ring 29 translatable inside the valve body 25, and the rear end 290 of which is suitable for pushing the coupling balls 27 outward in the groove 140 such that the valve body 25 remains fixed in translation relative to the intermediate female body 14.

Figure 4:
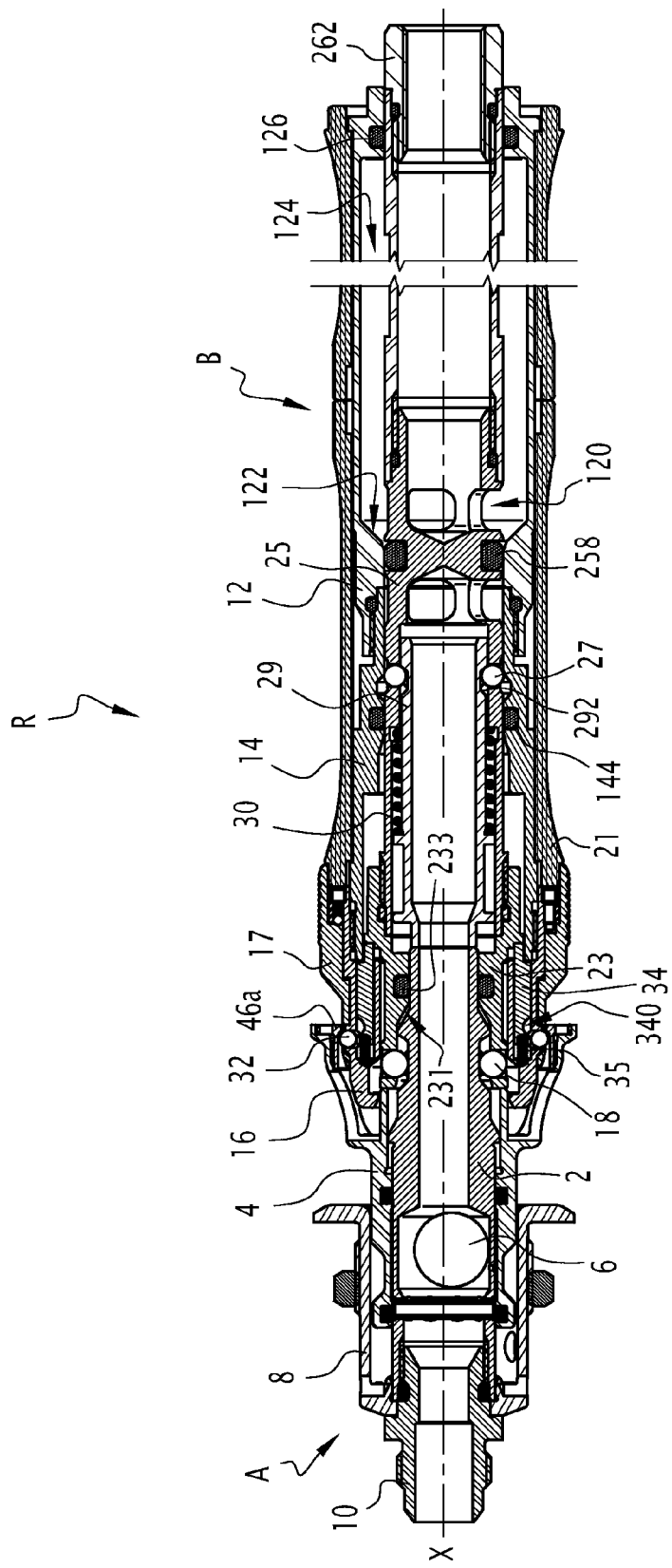

The inner ring 29 is translatable between a forward position, shown in FIG. 2, and a rear position, shown in FIG. 4, in which a groove 292 of the inner ring 29, the maximum diameter of which is smaller than that of the rear end 290, is radially aligned with the housings 260 such that the coupling balls 27 are received in the groove 292 and the valve body 25 is therefore freely translated relative to the intermediate female body 14.

The inner ring 29 is pushed back toward its forward position by a spring 30 bearing between an inner surface of a shoulder 264 of the valve body 25 and facing forward and an outer surface of a collar 294 of the inner ring 29 facing the rear.

The valve body 25 comprises, on its rear part, an adapter body 262 allowing the coupling with a second conduit C2 for example providing a supply of compressed air. The conduit C2 fluidly communicates with the channel 120.

The female element B includes steering means able to drive the purging ring 4 from its rear position toward its forward position during the uncoupling of the male A and female B elements by moving away from one another.

Figure 5:
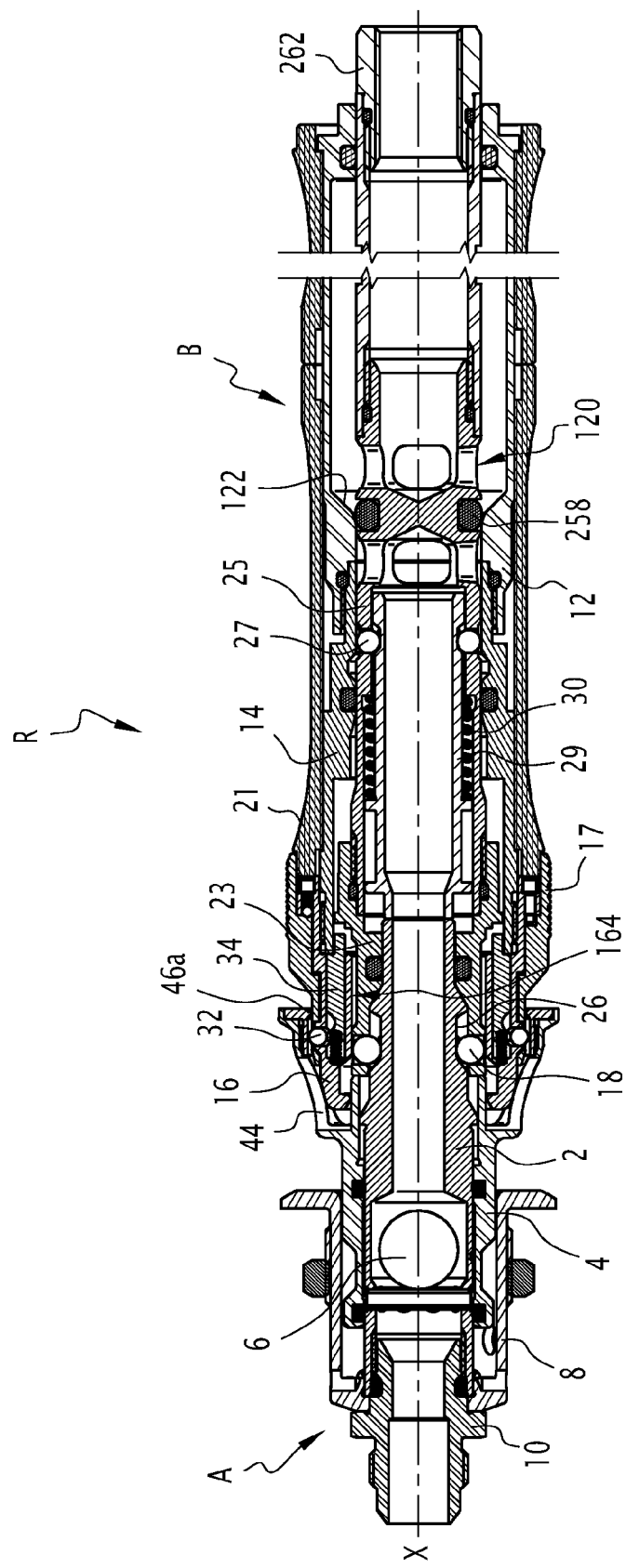
Figure 6:
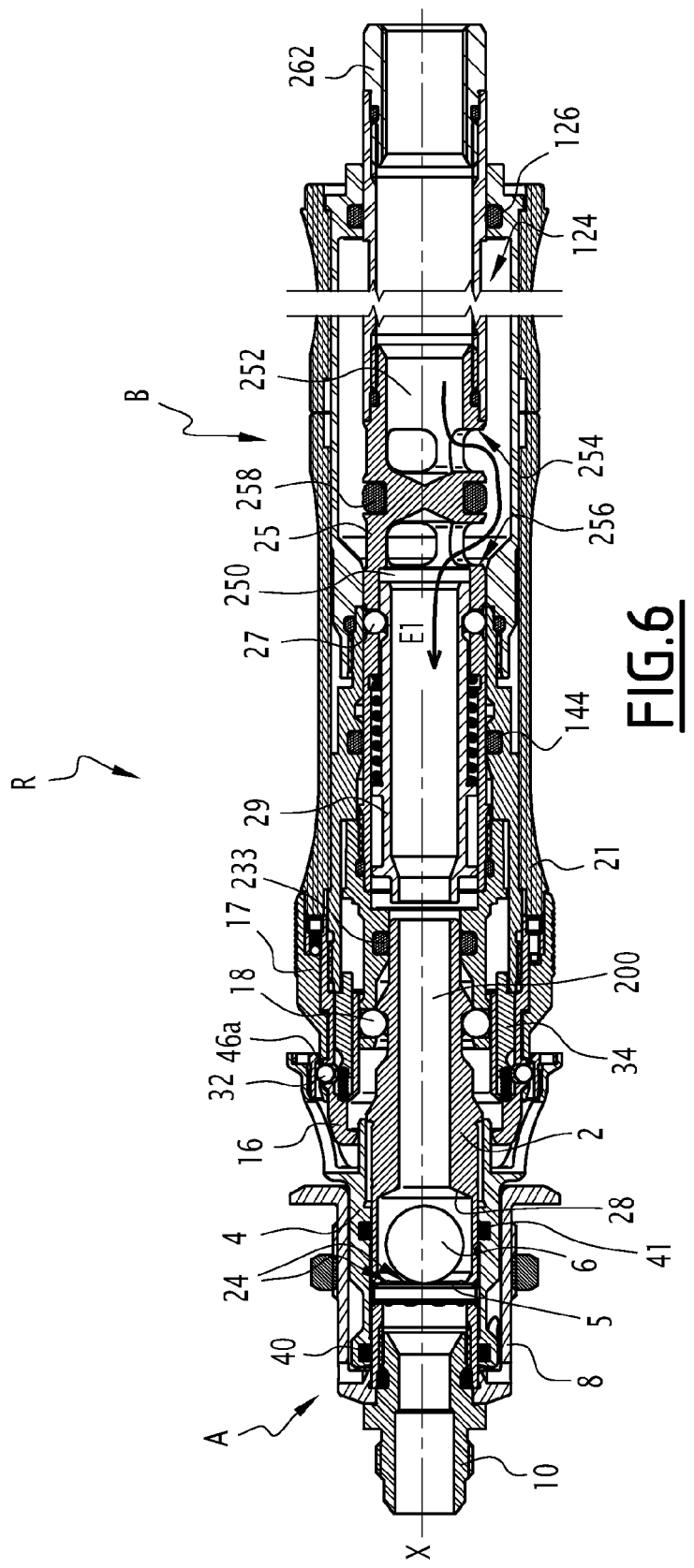
FIG. 6 is a longitudinal sectional view of the coupling of FIGS. 3 to 5 in the coupled configuration.

These steering means comprise steering balls 32 housed in the front female body 16, and movable between a first position, shown in FIGS. 5 and 6, in which they protrude from the front female body 16 so as to interfere with the purging ring 4, and a second position shown in FIG. 2, in which the steering balls 32 do not protrude from the front female body 16. The steering balls 32 are housed in orifices 162 of the front female body 16, and are able to protrude through the openings 170 of an outer ring 17, called selector ring, that extends around the front female body 16. The protruding positioning of the steering balls 32 forms an increase in the enclosure diameter of the selector ring 17 that becomes larger than the inner diameter of the collar 46a of the purging ring 4, which offers a means of cooperation between the steering balls 32 and the collar 46a to steer the purging ring 4 toward its forward position. It is said that the steering means interfere with the purging ring 4 when they are kept protruding from the female body 6 and are able to cooperate with the purging ring 4 in order for the latter to be steered forward.

Figure 11:
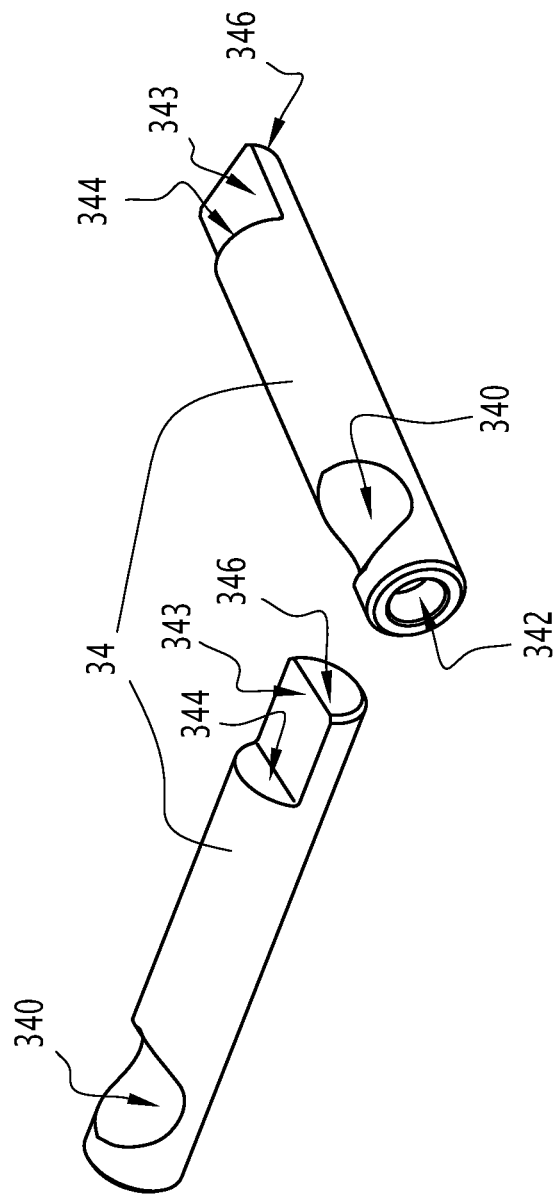
FIG. 11 is a perspective view, from two different angles, of a control finger of the female element.

The female element B comprises control fingers 34, also shown in FIG. 11, and steering balls 32 that bear on the radial surface of the control fingers 34. The control fingers 34 are housed in the front female body 16 along axes parallel to the axis X and are axially movable between a first position or rear position, shown in FIGS. 5 and 6, and in which the steering balls 32 are radially separated toward their first position, and a second position or forward position, shown in FIG. 2, in which the steering balls 32 are radially aligned with a half-moon notch 340 of the control FIGS. 34, in which the steering balls 34 are free to reach their second position.

The control fingers 34 are pushed back by a spring 35 toward their first position or rear position. The spring 35 is housed in an orifice 342 of the fingers 34, provided on the front side of the fingers 34. On the rear side of the fingers 34, a flat 343 defines a first stop surface 344, which is axially offset in the forward direction relative to a rear stop surface 346. The stop surfaces 344 and 346 are provided on either side of the longitudinal axis of the control fingers 34 such that, in their first position or rear position, the control fingers 34 are abutting against a surface 142 of the intermediate female body 14, and in their second position or forward position, abutting by the rear stop 346 against a surface 234 of the ball-retainer 23. The action exerted by the spring 35, which pushes the control fingers 34 back in the rear direction, results in the control fingers 34 following the translation of the ball-retainer 23 until abutting against the surface 142.

The selector ring 17 is rotatable around the axis X relative to the front female body 16. This rotation makes it possible to offset the openings 170 angularly relative to the steering balls 32 such that the steering balls 32 can be aligned radially with solid parts 172 of the selector ring 17, which is found between the openings 170 in the circumferential direction. Thus, the selector ring 17 makes it possible to lock the second position of the steering balls 32 and the second position of the control fingers 34, and therefore to selectively deactivate the steering means of the female element B through a simple maneuver by the operator. This maneuver makes the steering means inoperative. In a first angular position of the selector ring 17 shown in FIGS. 9 and 10, the steering balls 32 are then aligned with the solid parts 172 and therefore cannot protrude outside the front female body 16 and interfere with the purging ring 4, the solid parts 172 being radially inserted between the collar 46a and the steering balls 32. In a second angular position of the selector ring 17 shown in FIG. 2, the openings 170 are aligned with the steering balls 32 such that the steering balls 32 are free to protrude from the front female body 16 and through the openings 70 so as to interfere with the purging ring 4.

The steering balls 32 interfere with the purging ring 4 if their distance from the axis X does not allow the steering balls 32 to offset the collar 46a of the purging ring 4 during the uncoupling maneuver.

The selector ring 17 comprises elastic elements 174 and balls 176 making it possible to facilitate positioning of the selector ring 17 in one of its two positions.

The female element B also comprises an outer maneuvering sleeve 21 that surrounds the rear 12 and intermediate 14 female bodies and allows an operator to manipulate the female element B during the coupling, uncoupling and selection.

The operation of the coupling R is outlined below in reference to FIGS. 3 to 10.

Figure 7:
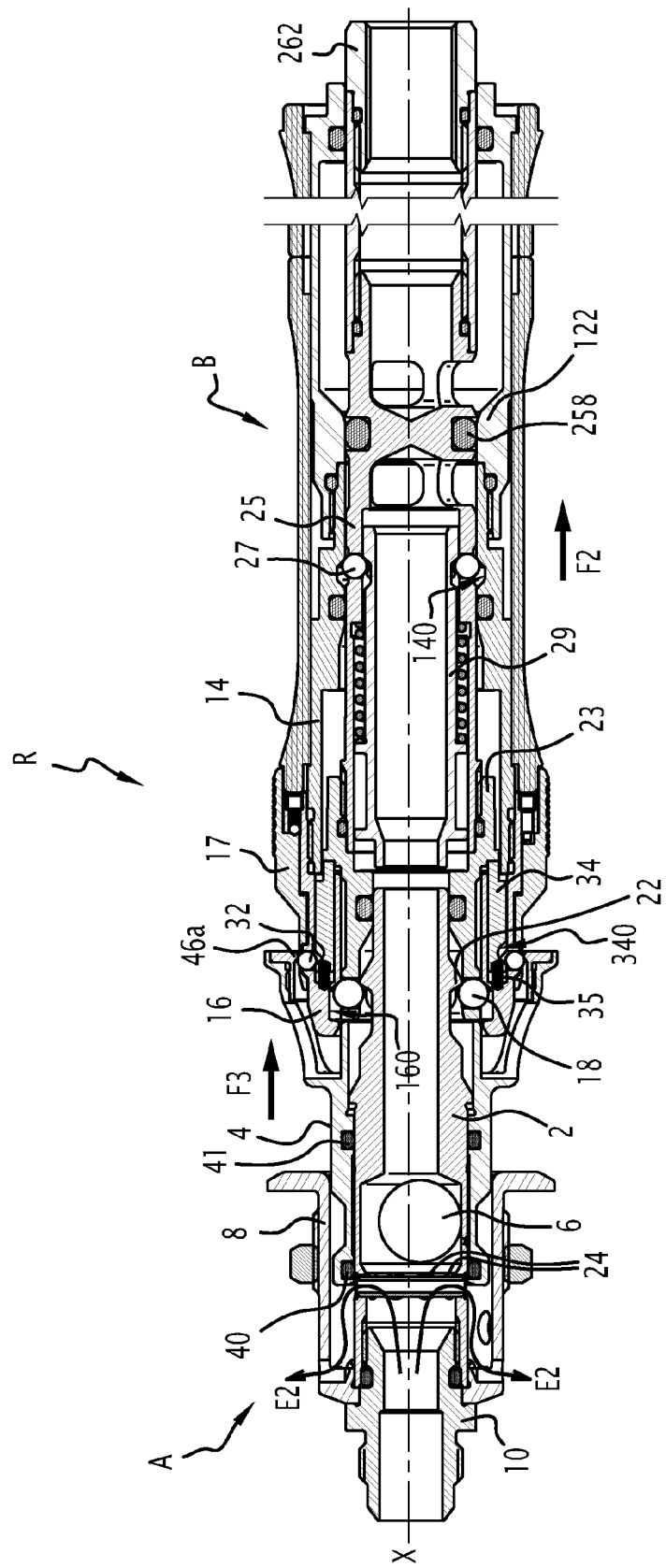
FIG. 7 is a longitudinal sectional view of the coupling of FIGS. 3 to 6, in a first uncoupling step.
Figure 8:
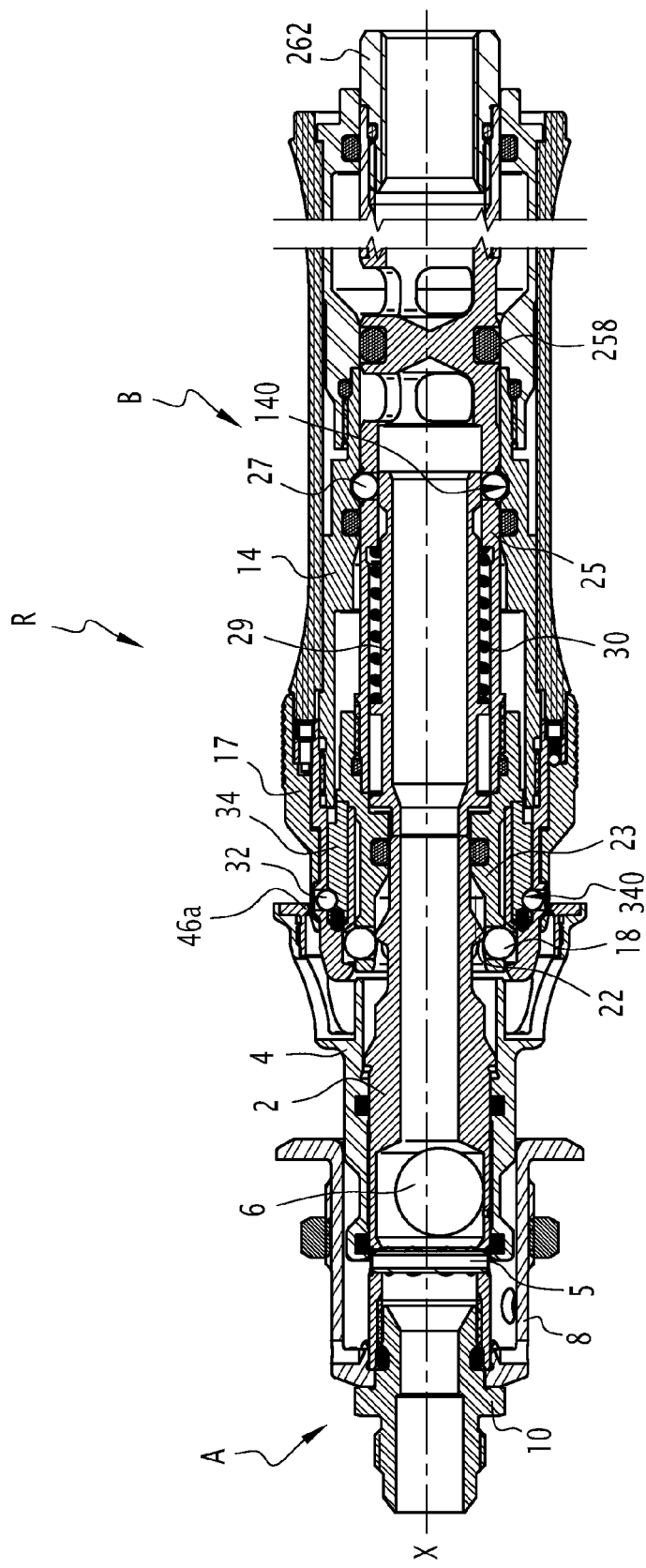
FIG. 8 is a longitudinal sectional view of the coupling of FIGS. 3 to 7, in a second uncoupling configuration.
Figure 9:
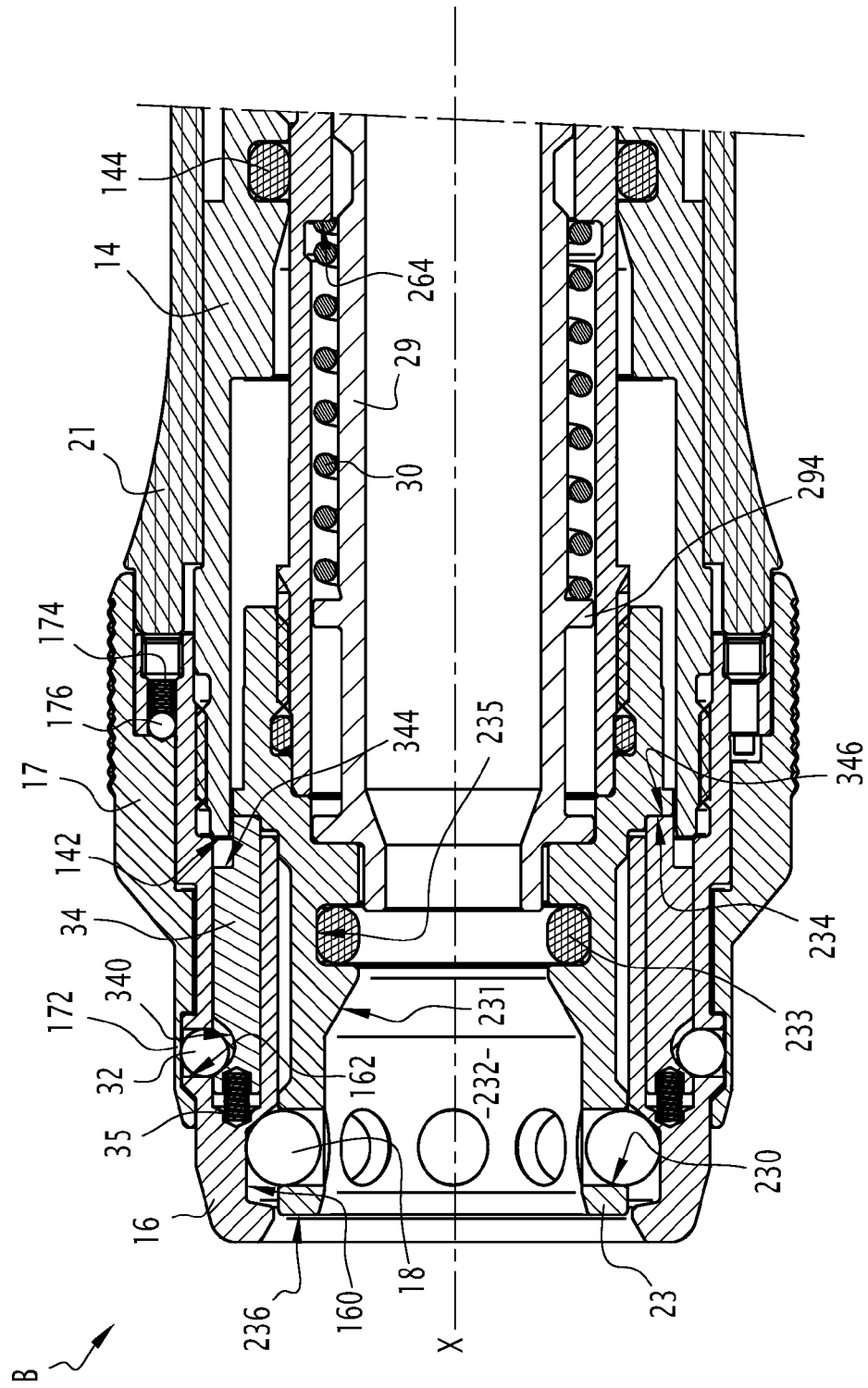
FIG. 9 is a longitudinal sectional view of the socket element of FIG. 2, in an alternative operating mode.
Figure 10:
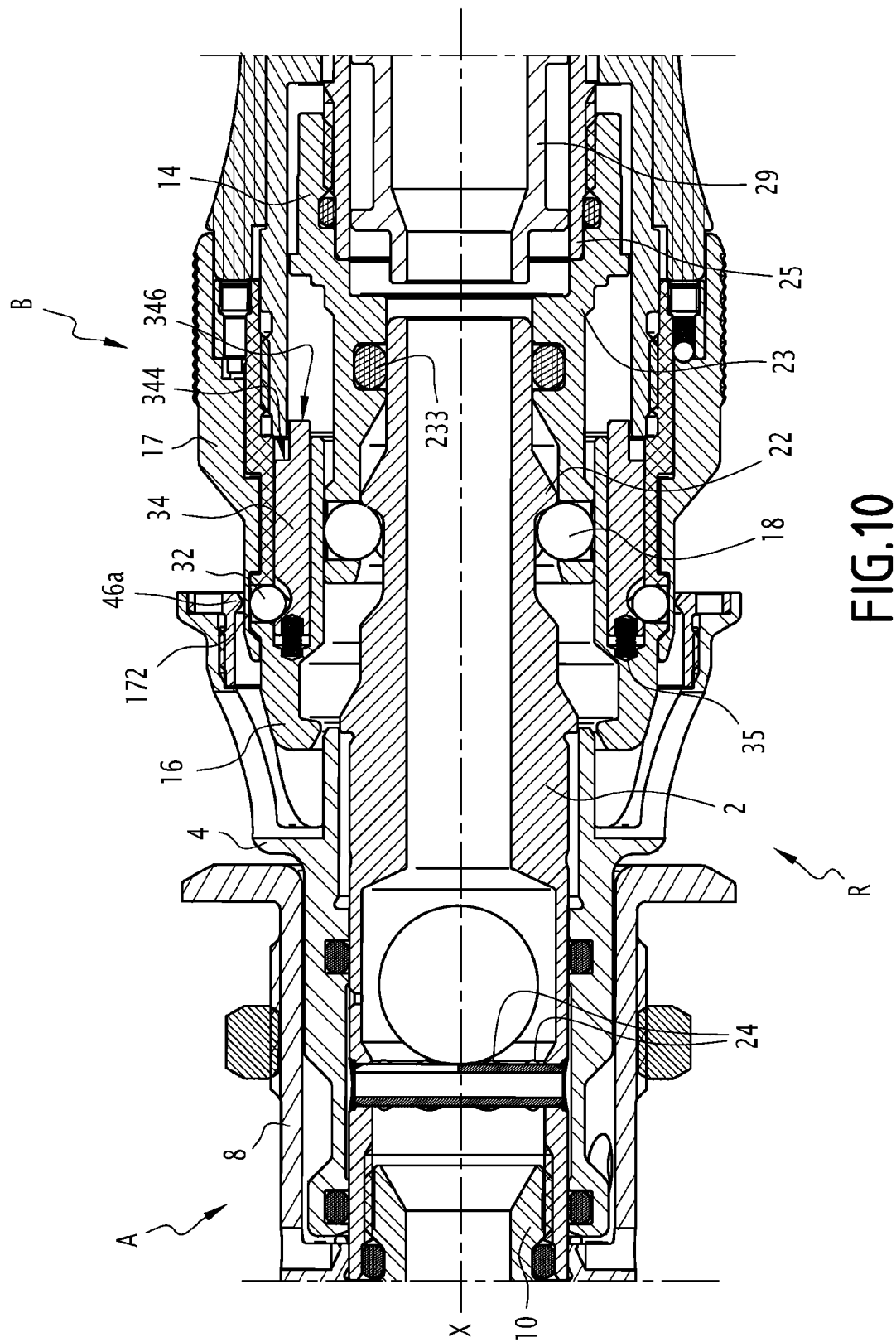
FIG. 10 is a longitudinal sectional view of the coupling of FIGS. 3 to 8, corresponding to an uncoupling phase in the operating mode of FIG. 9.

Through the rotation of the selector ring 17 relative to the front female body 16, two operating modes can be chosen: an activated operating mode, shown in FIGS. 2 to 8, in which the steering balls 32 can protrude from the front female body 16, and a deactivated mode, shown in FIGS. 9 and 10, in which the steering balls 32 are hidden by the solid parts 172. In the activated mode, the uncoupling and purging maneuver is done in a single removal motion, while in the deactivated mode, the uncoupling and purging maneuver is done in two separate movements.

In the deactivated mode, which may in particular be used during vehicle lifting operations in the garage, the purging is done via an additional maneuver by an operator following the maneuver to uncouple the coupling R.

In the activated mode, which may correspond to a quick tire change configuration, in which the uncoupling and purging maneuver must be done in a single movement for greater speed, the purging is done in the same maneuver as the uncoupling of the male and female elements of the coupling R.

In FIGS. 3 to 6, the coupling phase of the coupling in the activated operating mode is described. The coupling R is coupled when, for example, a vehicle arrives at a pit where an operator is located, the vehicle having the male element A whereof the purging ring 4 is shown in the forward position, the side purging passages 24 being clear. The female element B is manipulated by the operator using the outer maneuvering sleeve 21. The female element B is brought closer, aligned and placed in contact with the male body 2. The male A and female B elements, correctly positioned, are brought closer to one another such the front surface 236 of the ball-retainer 23, guided by the insertion of the male body 2 into the reception area 232, pushes the purging ring 4 back in the rear direction by contact with the stop 42, along arrow F1.

The locking balls 18 are free to move radially in their housing 260 in contact with the collar 22 and to cross it upon intersection with the male element A, since their free radial position makes it possible to offset the maximum diameter of the collar 22 upon coupling, when the balls 18 move radially toward their second position. The collar 22 is crossed when the locking balls 18 exceed the axial position, relative to the position of the male element A, which is situated at the apex of the collar 22. FIG. 3 shows this first coupling configuration, in which the collar 22 has axially crossed the locking balls 18. In this configuration, the control fingers 34 are in the second position or forward position, such that the steering balls 32 are radially free and positioned in the half-moon notches 340 so as not to protrude from the selector ring 17. Their radial position makes it possible to offset the minimal diameter of the collar 46a of the purging ring 4. In this configuration, the inner ring 29 has been pushed toward the rear by the front of the male body 2 and reaches a position situated midway from its withdrawn position. The coupling balls 27 keep the valve body 25 and the intermediate female body 14 secured to one another in translation. The circuits C1 and C2 are no longer in communication.

When the operator continues the coupling and insertion sequence of the male element A, the coupling R is found in a second configuration shown in FIG. 4. The inner ring 29 is pushed toward the rear enough for the groove 292 to be radially aligned with the coupling balls 27, which makes it possible for the coupling balls 27 to retract radially toward the axis X in the groove 292 and uncouple the intermediate female body 14 from the valve body 25, in other words to separate the two bodies 14 and 25 in translation. The inner ring 29 becomes coupled to the valve body 25 and secures them in translation, which results in limiting the movement of the valve body 25 in the forward direction under the effect of the thrust of the male body 2 and owing to the spring 30.

The valve body 25 driving the rearward movement of the ball-retainer 23, the latter moves relative to the front female body 16. The control fingers 34 being pushed toward the rear it by the springs 35, the control fingers 34 also move toward the rear, which results in the steering balls 32 radially exiting toward the outside of the notches 340. The steering balls 32 therefore begin to protrude outside the selector ring 17. The collar 46a is crossed by the steering balls 32 when the steering balls 32 exceed the axial position, relative to the position of the male element A, which is situated at the apex of the collar 46a.

In a third coupling configuration shown in FIG. 5, the insertion movement being continued, the ball-retainer 23 has begun bearing against the collar 22 and has withdrawn enough relative to the front female body 16 for the control fingers 34 to bear against the intermediate female body 14. The steering balls 32 therefore emerge maximally from the selector ring 17. The radial position of the steering balls 32 no longer makes it possible to offset the diameter of the collar 46a of the purging ring 4.

In the configuration of FIG. 5, the front female body 16 comes into contact with the extension 44 of the purging ring 4, which results in driving the purging ring 4 toward the rear and closing off the side purging passages 24. This closing off is effective and complete once the purging orifices 24 appear between the two inner seals 40 and 41 of the purging ring 4. The continued movement of the female element B has increased the axial offset between the ball-retainer 23 and the front female body 16 such that the locking balls 18 are now pushed back toward the axis X in the groove 26 by an inner surface 164 of the front female body 16. The radial position of the locking balls 18 no longer makes it possible to offset the maximal diameter of the collar 22. The locking balls 18 are therefore in their first position corresponding to the locking of the coupling R.

At the same time, the valve body 25 has continued its movement toward the rear of the female element B, and the sealing gasket 258 gradually loses contact with the seat 122, such that the valve is opened and the supply of compressed air to the downstream circuit C1 via the channel 200 begins. The position of the valve body 25 allows fluid to pass between the conduits C1 and C2.

When the coupling movement is completed, the coupled position shown in FIG. 6 is reached. The purging ring 4 has been pushed completely toward the rear, and the valve body 25 has been pushed back into its maximum rear position by the male body 2 so as to allow fluid to flow along arrow E1, from the rear piercing 252 toward the front piercing 250 through the openings 254 and 256. The fluid flows in the inner ring 29, then passes in the channel 200 and is thus transferred from the second conduit C2 toward the first conduit C1 to allow activation of the lifting jacks of the vehicle. The air circulates between the female element B and the male element A sealably with the outside, such that the passage of fluid is done. The valve ball 6 is separated from its seat 28 by the pressure of the fluid against a safety pin 5 of the male element A.

When the filling with air of the pneumatic jack circuit reaches a defined pressure, and the tire change operations of the vehicle have been performed, the operator initiates uncoupling of the coupling R to lower the vehicle. To that end, the operator pulls the female element B rearward along arrow F2. The steering balls 32 protruding from the selector ring 17, during the removal of the female element B, the latter bear against the inner collar 46a of the purging ring 4. The steering balls 32 therefore drive the purging ring 4 in the forward direction along arrow F3, such that the purging orifices 24 are no longer covered by the purging ring 4 and are no longer found between the seals 40 and 41. This configuration is shown in FIG. 7. The first conduit connected to the male element A therefore purges its air through the orifices 24, as shown by arrows E2. The jacks supplied by the first conduit decrease their pressure and the vehicle is lowered.

During the uncoupling movement, the locking balls 18 have been driven toward the front of the female element B by the collar 22. The balls 18 have, in their movement, driven the ball-retainer 23 in the forward direction relative to the front female body 16. In its forward movement, the ball-retainer 23 has raised the control fingers 34 from their stop 344 against the intermediate female body 14 by contact of the stop surface 346 against the ball-retainer 23, and moved the valve body 25 forward. In FIG. 7, the forward movement of the ball-retainer 23 has pushed the control fingers 34 back, such that the steering balls 32 are about to engage in the half-moon notches 340. The locking balls 18 are nearly axially aligned with the notch 160 and are about to cross the collar 22. The seal 258 once again bears against the seat 122, and fluid circulation is stopped. The coupling balls 27 are brought closer to the groove 140 and are about to be engaged therein, the coupling between the inner ring and the valve body 25 being about to end and the coupling between the valve body 25 and the intermediate female body 14 beginning.

In FIG. 8, the female element B has been further withdrawn toward the rear. The locking balls 18 still axially keep the ball-retainer 23 and the valve body 25 engaged with the male body 2 via the collar 22. The ball-retainer 23 has continued its forward movement and driven the control fingers 34 such that the fingers are completely returned toward their second position or forward position, allowing the steering balls 32 to resume their place in the half-moon notches 340 under the action of the passage of the collar 46a during the removal of the female element B. Under the action of the spring 30, which pushes the inner ring 29 back in the forward direction, the coupling balls 27 are housed in the groove 140, coupling the valve body 25 with the intermediate female body 14. The action of the spring 30 contributes to pushing the male element A back in the rear direction to end the uncoupling maneuver, in particular from the second coupling configuration.

Operation in the deactivated mode of the coupling R is shown in FIGS. 9 and 10, the coupling configurations remaining identical. In this operating mode, the steering balls 32 are kept retracted in their housing 162 and in the notches 340 of the control fingers 34, by the solid parts 172 of the selector ring 17. The steering balls 32 therefore cannot protrude from the selector ring 17 and cannot interfere with the purging ring 4 or act on the opening of the purging orifices 24 upon removal of the female element B. Keeping the steering balls 32 in the retracted position prevents the control fingers 34 from moving away in the rear direction under the action of the springs 35 when the contact between the rear stop 346 and the stop 234 is lost during the coupling of the coupling R.

During the removal maneuver shown in FIG. 10, the purging ring 4 therefore is not pulled in the forward direction by the steering balls 32, and the uncoupling maneuver continues without the first conduit C1 being purged. After the removal of the female element B from the male element A, the operator must maneuver the purging ring 4 in the forward direction to lower the vehicle, and to prepare the male element A for future coupling operations. The uncoupling maneuver shows a sequence with a third, second and first coupling configuration from the fourth coupling configuration for the passage of fluid.

The four described mutual approach configurations are identified in the coupling or uncoupling sequence of the coupling R, associated with the fitting of the male element A in the female element B of the coupling R.

The springs 35 and the spring 30 are sufficient to allow the automatic operation of the coupling R. These springs, as well as the friction of the seals of the female element B, exert a force that the operator must counter during the coupling maneuver.

A second embodiment of the invention is shown in FIGS. 12 to 16. In this embodiment, the elements shared with the first embodiment bear the same references and operate in the same manner. Only the differences with respect to the first embodiment are outlined below.

Figure 12:
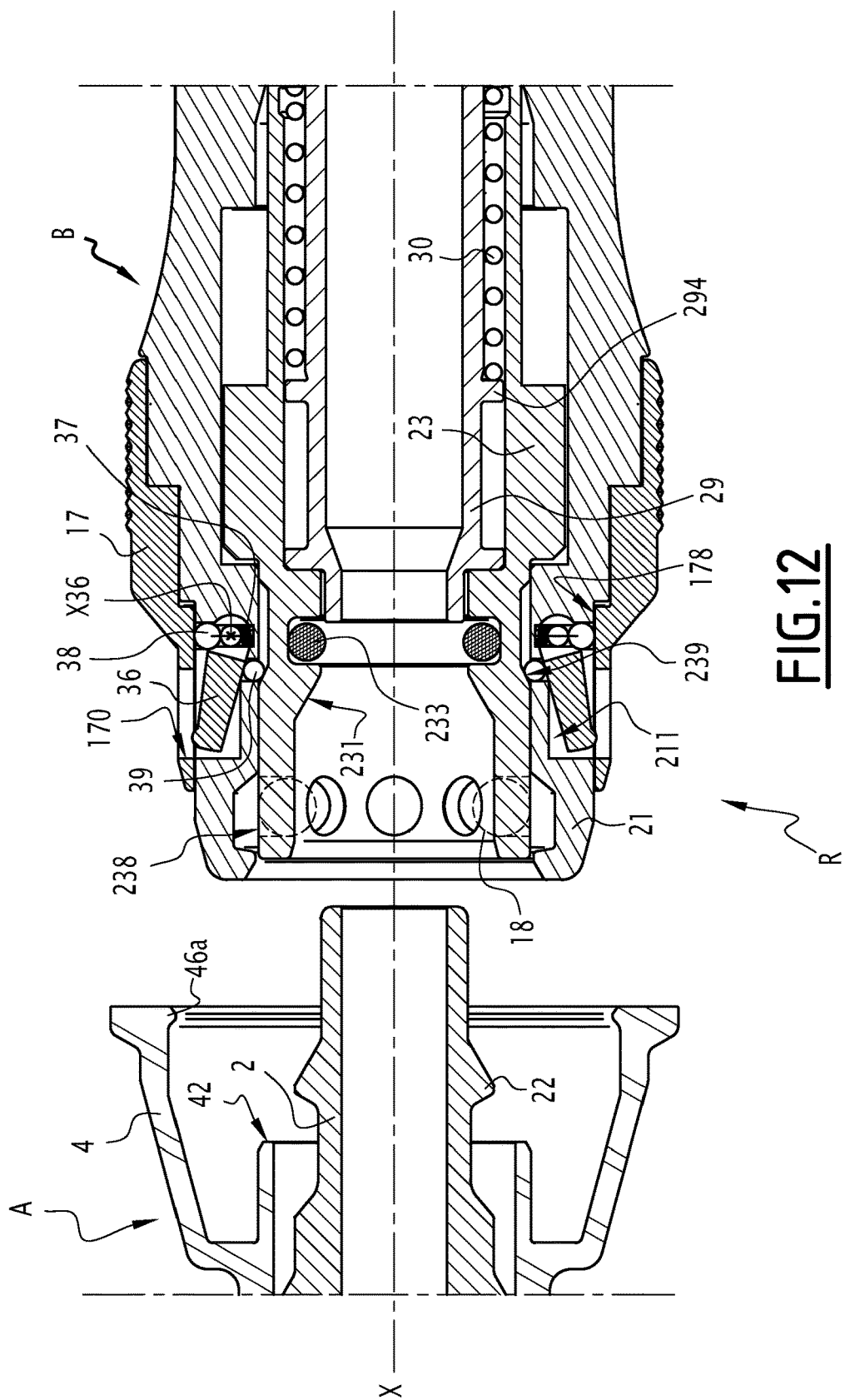
FIG. 12 is a longitudinal sectional view of a coupling according to a second embodiment of the invention, in the uncoupled configuration.
Figure 13:
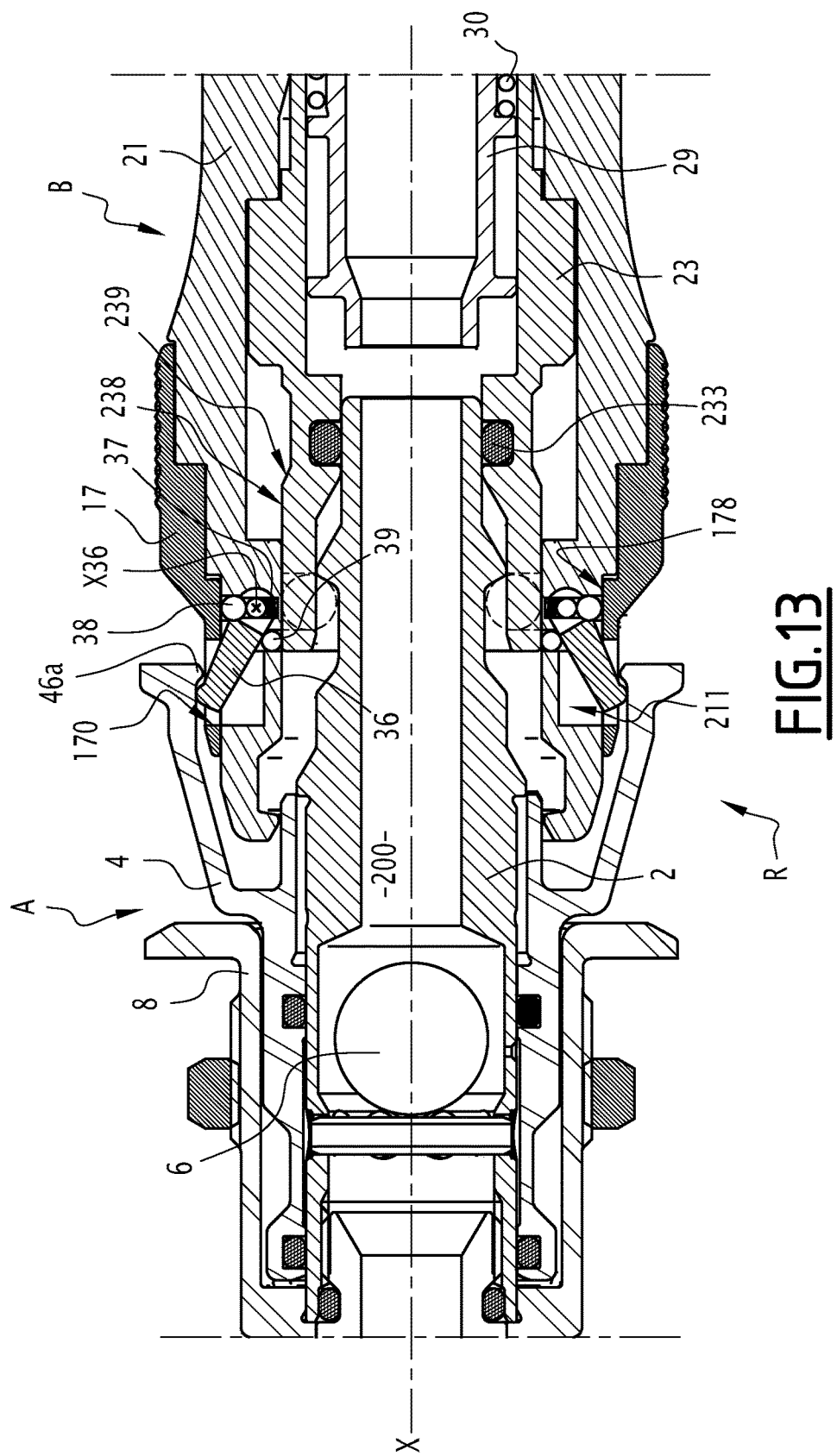
FIG. 13 is a longitudinal sectional view of the coupling of FIG. 12, in a coupled configuration.

In this embodiment, the deactivatable steering means are formed, in place of the steering balls 32, by claws 36 movable between a deployed position, shown in FIG. 13, and a retracted position, shown in FIG. 12. In their deployed position, the claws 36 protrude through the openings 170 of the selector ring 17 and interfere with the collar 46a. In the retracted position, the claws 36 do not protrude outside the openings 170 and do not interfere with the purging ring 4.

The claws 36 are rotatable between their deployed position and their retracted position around an axis X36. The axes X36 are outwardly separated by springs 37. The outer maneuvering sleeve, the front female body and the intermediate female body are joined in a single body 21. Balls 38 are inserted between the axes X36 and an inner surface 178 of the selector ring 17.

The female element B includes control balls 39 of the claws 36. The control balls 39 are movable in radial wells 211 traversing the body 21 between a low position, shown in FIG. 12, and a high position, shown in FIG. 13. In their low position, the balls 39 do not push the claws 36 back toward the outside toward their deployed position. In their high position, the control balls 39 push the claws 36 back and outwardly maintain the claws 36, toward their deployed position. The control balls 39 are suitable for cooperating by contact with an outer surface 238 of the ball-retainer 23 and with a ramp 239 of the ball-retainer 23, which extends the surface 238 rearward with a decreasing diameter. Thus, based on the position of the ball-retainer 23 along the axis X relative to the body 21, the control balls 39 are more or less outwardly separated so as to control the rotation of the claws 36 between a retracted position and a deployed position.

In the uncoupled configuration of the coupling shown in FIG. 12, the control balls 39 are positioned on the ramps 239. The balls 39 are therefore in their low position, the claws 36 are free to reach their retracted position by a centripetal movement and therefore appear in the retracted position.

During the coupling, the female element B is fitted on the male element A, the ball-retainer 23 undergoes a rearward translational movement, which results in the control balls 39 crossing the ramp 239 to be found in contact with the surface 238, the diameter of which is larger than that of the ramp 239. The control balls 39 are therefore separated toward their high position, and therefore push and keep the claws 36 toward their deployed position.

The coupling of the ball-retainer 23 and the intermediate female body 14 during the first coupling phase results in the collar 46a of the purging ring 4 being located above openings 170 such that the collar 46a is found behind the claws 36 when they reach the deployed position.

Figure 14:
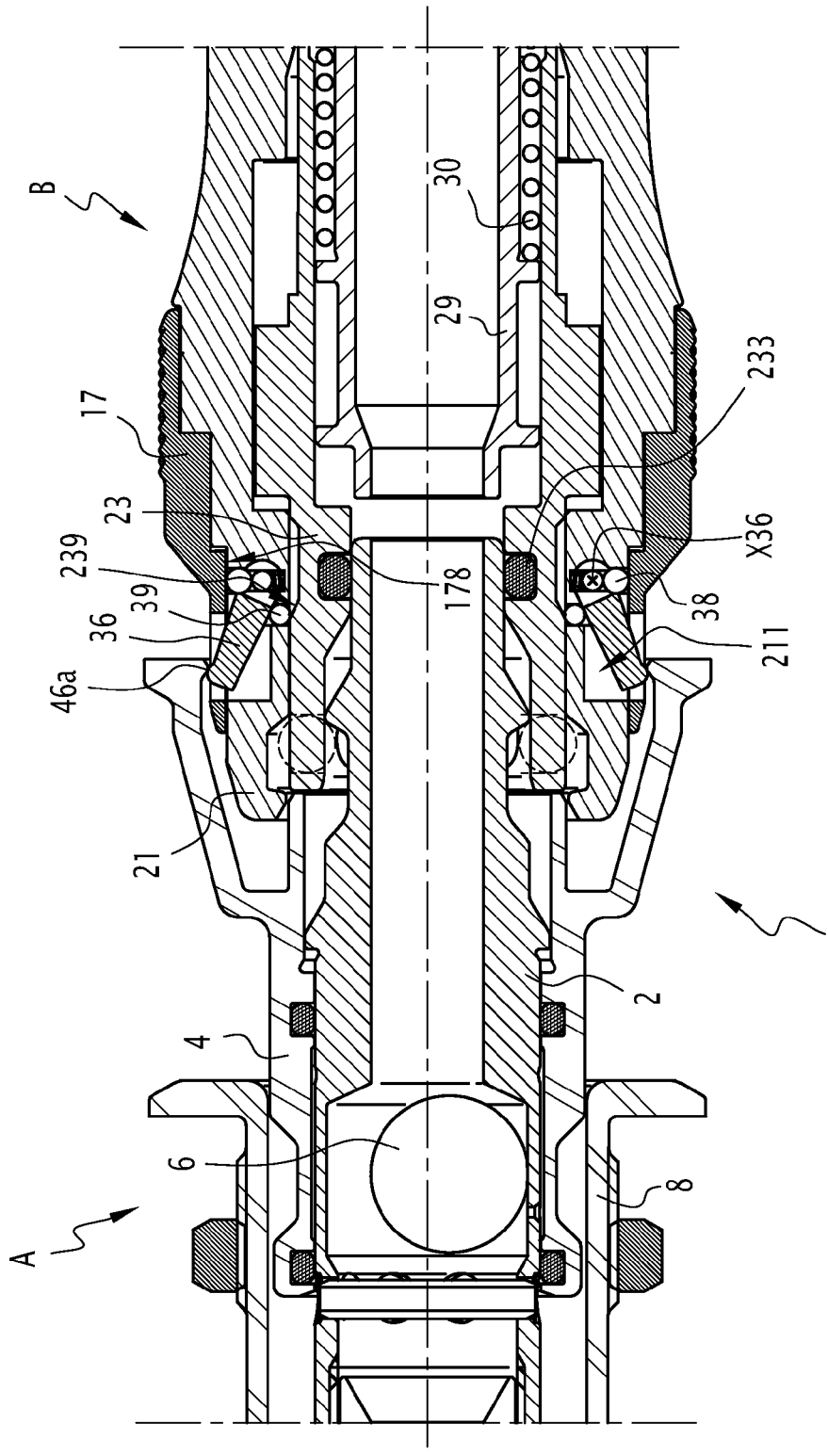
FIG. 14 is a longitudinal sectional view of the coupling of FIGS. 12 and 13, in an uncoupled configuration.

During the uncoupling shown in FIG. 14, the claws 36 in the deployed position drive the purging ring 4 toward its forward position. Next, the removal of the male element A results in translating the ball-retainer 23 forward to an axial position in which the balls 39 again bear against the ramp 239 and return to their low position. The claws 36 are then free to be pushed back toward the axis X by the collar 46a, allowing the release of the purging ring 4 from the female element B and the complete removal of the male element A.

In this embodiment, the selector ring 17 also makes it possible to place the female element B in the deactivated operating mode. To that end, the inner surface 178, with which the balls 38 cooperate, is provided with notches 178a, which extend over limited angular sectors. These notches 178a are suitable for accommodating the balls 38 so as to allow them to be separated outwardly under the action of the springs 37. This results in moving the rotation axis X36 outward. The outward movement of the axis X36 modifies the rotation kinetics of the claws 36 such that the control balls 39, in their high position shown in FIG. 15, no longer push the claws 36 back to their deployed position of the activated mode, but to an intermediate position in which the claws 36 do not protrude from the selector ring 17 and do not hinder the collar 46a during the uncoupling maneuver.

By the rotation around the axis X of the selector ring 17, the balls 38 alternatively find themselves across from the notches 178a or the surface 178 again. As shown in FIG. 16, when the ball-retainer 23 is positioned in the same axial position as FIG. 15, the control balls 39 separate the claws 36 outwardly such that they interfere with the collar 46a in the activated operating mode.

Figure 17:
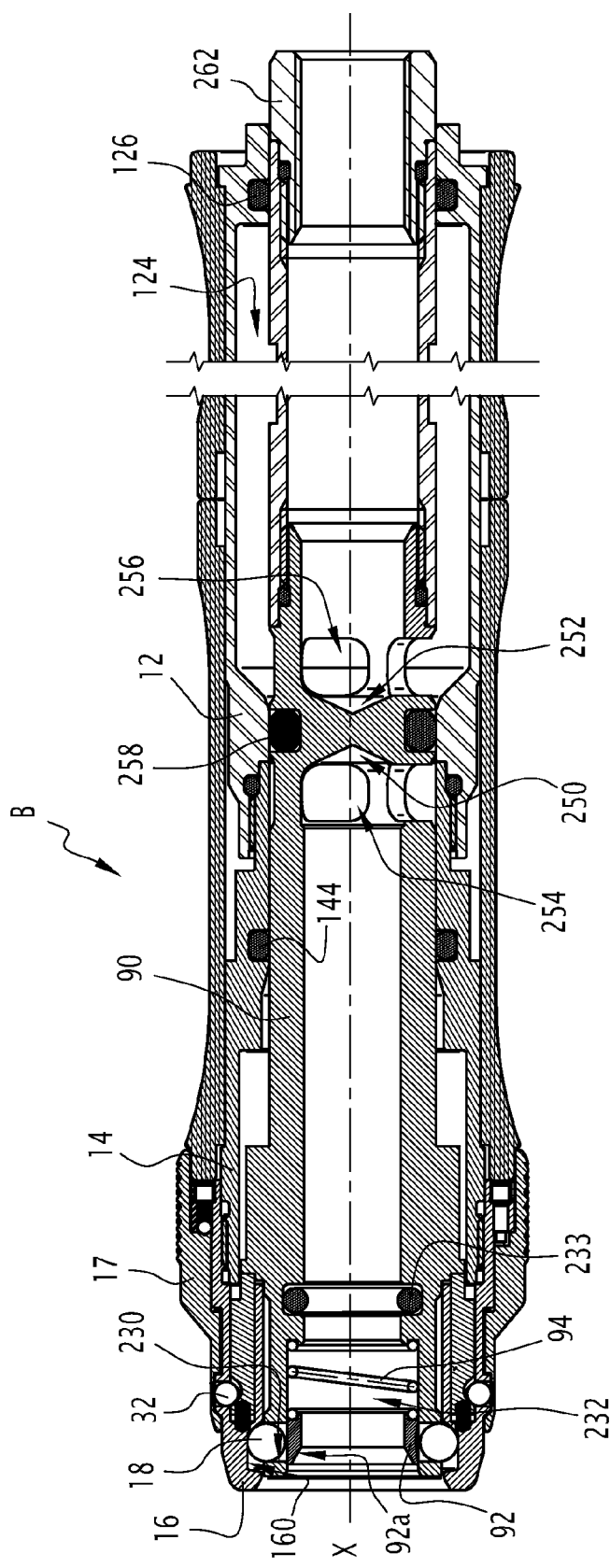
FIG. 17 is a longitudinal sectional view of a female element belonging to a coupling according to a third embodiment of the invention.
Figure 18:
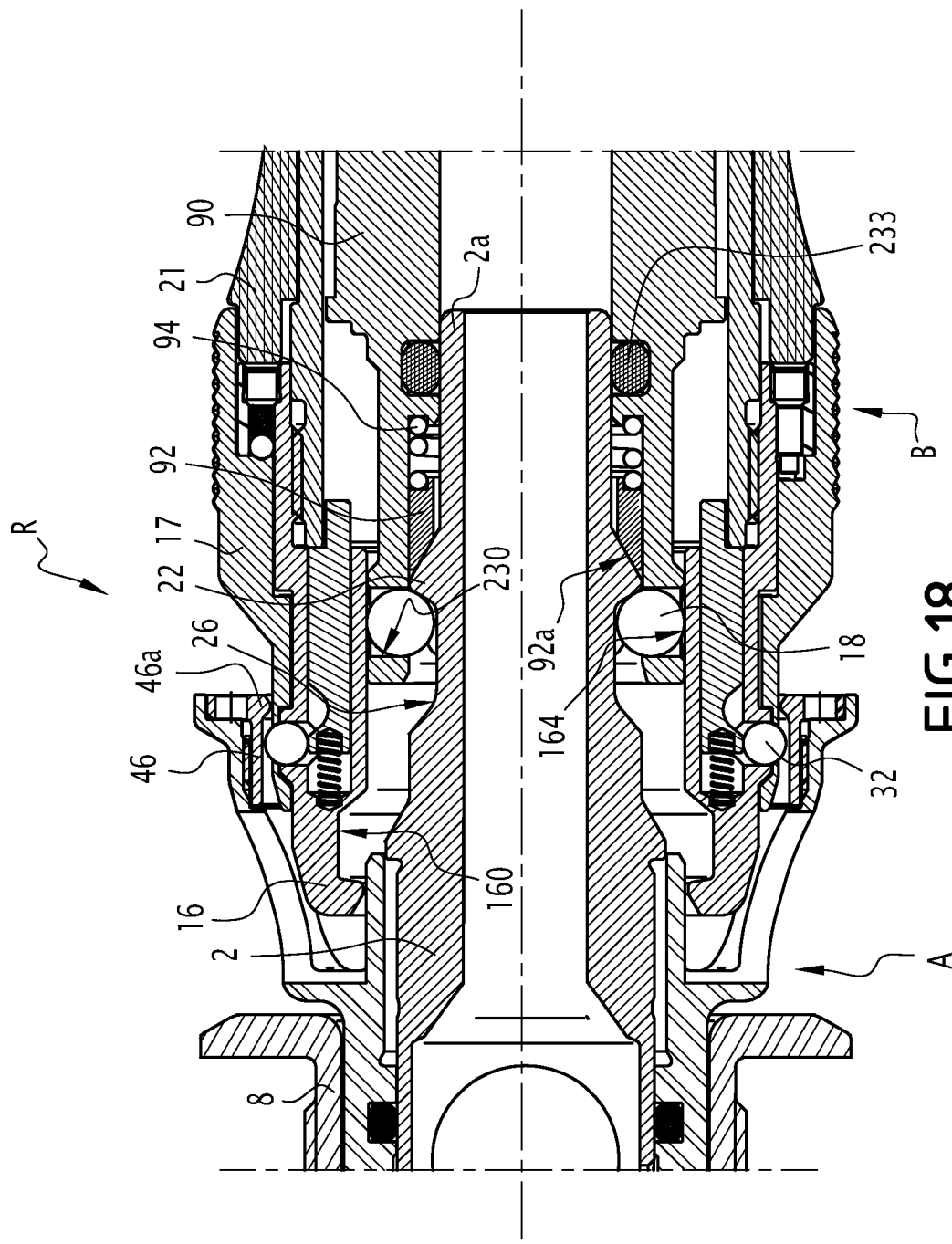
FIG. 18 is a longitudinal sectional view, in the coupled configuration, of the coupling incorporating the female element of FIG. 17.

A third embodiment of the invention is shown in FIGS. 17 and 18. In this embodiment, the elements shared with the first embodiment bear the same references and operate in the same manner. Only the differences with respect to the first embodiment are described below.

As shown in FIG. 17, the ball-retainer 23 and the valve body 25 are joined in a single piece 90, and the locking balls 18 also act as coupling balls to couple the body 90 with the female body. More specifically, in the uncoupled configuration of the female element B, the body 90 is kept coupled with the front female body 16 by the locking balls 90, which are engaged in the slot 160. An inner ring 92 housed in the receiving area 232 is axially aligned with the housings 230 and the balls 18 such that it keeps the balls 18 in the slot 160. A spring 94 keeps the inner ring 92 in its front position, in which it keeps the balls 18 in the slot 160, and consequently the body 90 coupled with the front female body 16.

The inner ring 92 plays a role similar to that of the inner ring 29 of the first embodiment, and in the uncoupling phase is no longer coupled, but kept behind by the male body 2 against the force of the spring 94. Indeed, during the approach of the female element B, the front end 2a of the male body 2 engages in the inner ring 92, the inner diameter of which is larger than the outer diameter of the front end 2a. The inner ring 92 has a frustoconical surface 92a complementary to the geometry of the collar 22. During its insertion, the male body 2 therefore pushes the inner ring 92 back toward the rear, against the force exerted by the spring 94. The collar 22 of the male body 2 pushes the ring 92 back toward the rear until the groove 26 arrives across from the housings 230. At that time, the ring 92 and the collar 22 no longer prevent the balls 18 from being engaged in the groove 26. The balls 18 are then freed from the slot 160, and the body 90 is then no longer coupled with the front female element 16 and is free to move toward the rear under the action of the continuous thrust from the male body 2. When the thrust from the male body 2 continues, as shown in FIG. 18, the male body 2 is locked in the body 90 by the balls 18, which are housed in the groove 26 and maintained therein by the inner surface 164 of the front female body 16.

Alternatively, and in the context of the invention, it is provided that some configurations are reached in a different order from the first embodiment described above relative to the approach travel of the coupling elements, or that the configurations are reached at a similar mutual separation distance from the coupling elements during the coupling or uncoupling maneuvers.

According to one embodiment that is not shown, the control fingers 34 can be replaced by a ramp arranged on the ball-retainer 23 and able to push back and maintain the steering balls 32 directly toward their outer position in which they interfere with the purging ring 4. In such a case, the steering balls 32 are combined with control balls similar to the control balls 39, and are movable between an upper diameter, for which the steering balls 32 protrude from the front female body 16 and interfere with the collar 46a of the purging ring 4, and an upper diameter for which the steering balls 32 do not protrude from the front female body 16, according to a principle similar to that of the second embodiment.

According to another embodiment that is not shown, the locking relief of the male body 2 may not comprise a collar 22 and be formed only by a groove similar to the groove 26 with a diameter smaller than the diameter of the front part of the male body 2, forming an obstacle for the locking balls 18 by opposing the removal from the groove in the third coupling configuration.

According to another embodiment that is not shown, a member of the female body 6 or attached on the female body 6 can keep the locking balls 18 in their first position in the third coupling configuration of the coupling R.

According to another embodiment that is not shown, the groove 26 may have a smaller axial width such that the ball-retainer 26 does not bear on the collar 22, but the ball-retainer 23 is axially retained upon coupling by the stop of the locking balls 18 on the bottom of the groove 26.

According to another embodiment that is not shown, the steering means of the purging ring 4 can protrude from the selector ring 17 upon coupling without interfering with the purging ring 4, for example by retracting elastically in contact with the collar 46a upon coupling, and while being kept protruding during the uncoupling to drive and interfere with the purging ring 4.

According to another embodiment that is not shown, the male body 2 may include a receiving relief of the front seal 41, which allows the latter to be partially inserted into the male body 2 so as to allow the purging ring 4 to return in two stages, differentiated by a pronounced moment where the rear seal 40 partially overlaps the purging orifices 24, the seal 41 being partially engaged in the reception relief of the male body 2. This allows slow purging and gradual lowering of the vehicle.

According to another embodiment that is not shown, the female element B has a front enclosure for receiving the purging ring 4 between the ball-retainer 23 and the front female body 16 upon coupling, the purging ring 4 having an outer collar, forming a diameter extension that extends opposite the axis X, and the control fingers 34 acting on the outside of the locking balls 18, such that in the configuration of the activated steering means, the locking balls 18 retract inward according to a diameter smaller than the diameter of the collar to drive the purging ring 4 toward its forward position.

According to another alternative, the locking balls of the coupling can be replaced by another means of cooperation with the relief of the male element that makes it possible to limit the mutual separation of the two elements and the removal of the female element B upon coupling.

The passage of air can be considered from the first conduit C1 toward the second conduit C2 such that the fluid distribution configuration is reversed, from the upstream circuit connected to the compressor and to the first conduit C1 toward the downstream circuit connected to the pneumatic jack network and the second conduit C2.

The technical features of the embodiments and alternatives described above may be combined to form other embodiments of the invention.

The invention claimed is:

1. A quick coupling for sealably joining fluid conduits, including a male element suitable for being connected to a first conduit and a female element suitable for being connected to a second conduit, the male element including:
   a male body provided with a locking relief and defining an inner channel in communication with the first conduit,
   a purging ring of the first conduit, surrounding the male body, and movable between a rear position, in which the purging ring closes off a purging passage of the male body, and a forward position, in which the purging ring no longer closes off the purging passage,
the female element including:
   a female body defining an inner channel in communication with the second conduit,
   a ball-retainer arranged inside the female body, forming a receiving housing of the male body and bearing locking balls of the male body, said locking balls being movable in a housing between a first position, in which they are able to oppose the removal of the locking relief, and a second position, in which the locking balls allow the removal of the locking relief,
   a valve body secured to the ball-retainer, translatable in the female body between a forward position, in which it closes off the fluid passage toward the second conduit, and a rear position, in which the passage toward the second conduit is open, the valve body including coupling balls suitable for securing the valve body and the female body in translation,
   an inner ring arranged inside the valve body, suitable, in a retaining position, for keeping the valve body and the female body coupled by the coupling balls when the female element is uncoupled from the male element,
wherein:
   in a first coupling configuration by bringing the male element and the female element closer together, the locking balls have crossed the locking relief of the male element,
   in a second coupling configuration by coming closer together, the inner ring has reached a position in which it no longer keeps the valve body and the female body coupled by the coupling balls,
   in a third coupling configuration by coming closer together, the female body keeps the locking balls in their first position,
   in a fourth coupling configuration by coming closer together, the valve body has reached a position that allows fluid to pass between the two conduits,
   the female element includes steering means able to drive the purging ring from its rear position toward its forward position during the uncoupling of the male and female elements by moving away from one another.

2. The quick coupling according to claim 1, wherein the steering means can be selectively deactivated such that they do not drive the purging ring during uncoupling.

3. The quick coupling according to claim 2, wherein the female element comprises a selector ring allowing the deactivation of the steering means, mounted around the female body and rotatable between a first position, in which it keeps the steering means in a position in which they cannot drive the purging ring during uncoupling of the male and female elements, and a second position, in which the steering means are able to drive the purging ring from its rear position toward its forward position during the uncoupling.

4. The quick coupling according to claim 1, wherein the steering means are steering balls housed in the female body and movable between a first position, in which the steering balls protrude from the female body and interfere with the purging ring, and a second position, in which the steering balls do not protrude from the female body.

5. The quick coupling according to claim 4, wherein the female element includes control fingers of the steering balls, movable between a first position, in which the steering balls are moved radially away from their first position, and a second position, in which the steering balls are radially aligned with a notch of the control fingers and are free to reach their second position.

6. The quick coupling according to claim 5, wherein the control fingers of the steering balls are kept in their second position by the ball-retainer against a force of a spring in the first and second coupling configurations, and are kept in their first position by the female body in the third and fourth coupling configurations.

7. The quick coupling according to claim 1, wherein the steering means are claws movable between a deployed position, in which they protrude from the female body and interfere with the purging ring, and a retracted position, in which the claws do not interfere with the purging ring.

8. The quick coupling according to claim 7, wherein the female element includes control balls of the claws, movable between a low position, in which the claws are free to reach their retracted position centripetally, and a high position, in which the control balls keep the claws in their deployed position.

9. The quick coupling according to claim 8, wherein the control balls bear on a ramp of the ball-retainer between a lower diameter corresponding to the retracted position of the claws and an upper diameter corresponding to the deployed position of the claws.

10. The quick coupling according to claim 1, wherein in the fourth coupling configuration by coming closer together, the purging ring is in the rear position, in which the purging ring closes off a purging passage of the male body.

11. The quick coupling according to claim 1, wherein in the second coupling configuration by coming closer together, the inner ring has reached a position in which it couples itself to the valve body via the coupling balls.

12. The quick coupling according to claim 1, wherein the inner ring is returned toward its retained position in which it keeps the valve body and the female body coupled by the action of a return spring during the uncoupling.

13. The quick coupling according to claim 1, wherein in the third coupling configuration by coming closer together, the steering means have passed an inner collar of the purging ring.

14. The quick coupling according to claim 1, wherein the locking balls and the coupling balls are identical and supported by the ball-retainer.

15. The quick coupling according to claim 1, wherein the female element includes a control and steering ball bearing on a ramp of the ball-retainer between an upper diameter for which the ball protrudes from the female body and interferes with the inner collar of the purging ring, and an upper diameter for which the steering and control ball does not protrude from the female body.

* * * * *